Dec. 20, 1949   C. H. BROOKS   2,491,603
ELECTRICAL CONTACT DEVICE
Filed June 10, 1948   2 Sheets-Sheet 1

Inventor:
Charles H. Brooks
By: Lee J. Gary
Attorney

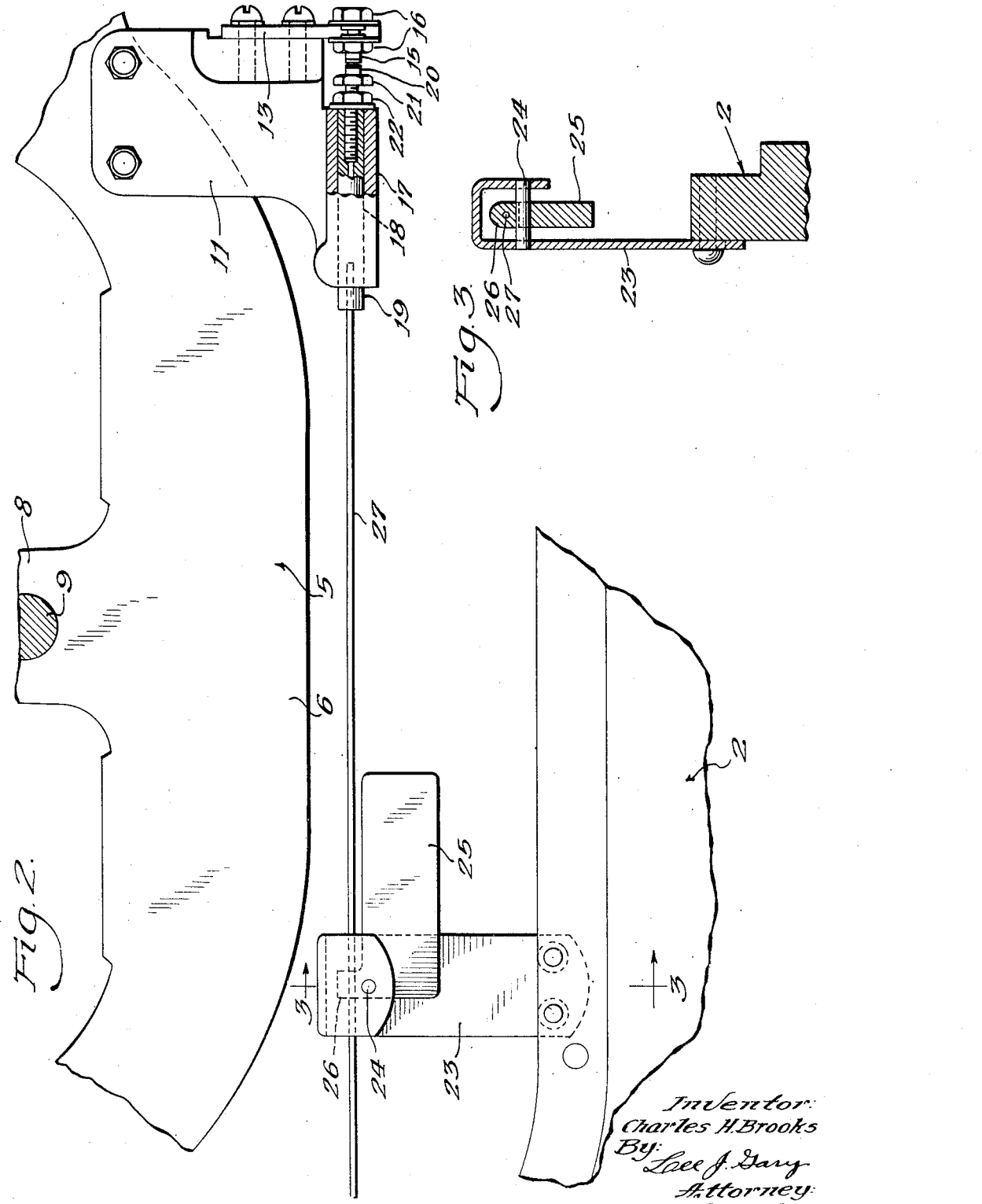

Patented Dec. 20, 1949

2,491,603

UNITED STATES PATENT OFFICE 2,491,603

ELECTRICAL CONTACT DEVICE

Charles H. Brooks, Milan, Ill., assignor to Bear Manufacturing Company, Rock Island, Ill., a corporation of Delaware Application June 10, 1948, Serial No. 32,230

4 Claims. (Cl. 200—52)

This invention relates to improvements in a contact device for a machine for testing the dynamic balance of rotating bodies, and refers particularly to a device for making and breaking an electric circuit in response to the unbalanced condition of a rotating body.

In testing the dynamic balance of rotating bodies, one form of balance testing machine indicates a condition of unbalance of a body being rotated by employing the displacement of eccentricity of motion of the rotating body to make and break a primary electric circuit inductively coupled to a high tension circuit, the high tension circuit, upon the breaking of the primary circuit, giving an indication, such as, a spark, a glow discharge in a gas filled tube or the like, to indicate unbalance of the body. Such a machine is shown generally in United States Patent Number 2,412,473 to E. L. Schnoebelen.

In devices heretofore proposed, making and breaking of the primary circuit has been accomplished by two relatively movable contacts, one carried by the cradle which carries the rotating body and is responsive to eccentric movement of the unbalanced body, and the other carried by the frame of the machine. In view of the fact that the degree of movement of the cradle in response to unbalance of the body is proportional to the degree of unbalance, the contact mounted upon the frame is manually adjustable toward or away from the other contact so as to compensate for different degrees of movement of the cradle. In addition, the contact carried by the cradle is spring-pressed, so that excessive swings of the cradle will not damage the contacts.

In order to secure the exact point of unbalance upon the body, it is necessary, when operating the machine to "back off" the adjustable contact until the contacts barely touch at the maximum swing of the cradle. Otherwise the cradle contact may dwell in contact with the frame contact until after the maximum point of unbalance has been passed. This is a likely occasion for human error unless the machine is operated by a skilled operator.

As a feature of the present invention, two contacts are employed for the making and breaking of the primary circuit, both contacts being movable, whereby breaking of the primary circuit automatically occurs at the instant reversal of movement of the cradle takes place thus automatically indicating the exact point of unbalance of the body, with the necessity for no manual adjustments of the contacts.

Other objects and advantages of the present invention will be apparent from the accompanying drawings and following detailed description.

Fig. 2 is an enlarged detail view of a portion of the cradle, parts of the contact mechanism being shown in section.

Fig. 3 is a sectional view taken on line 3—3 of Fig. 2.

Figure 1:
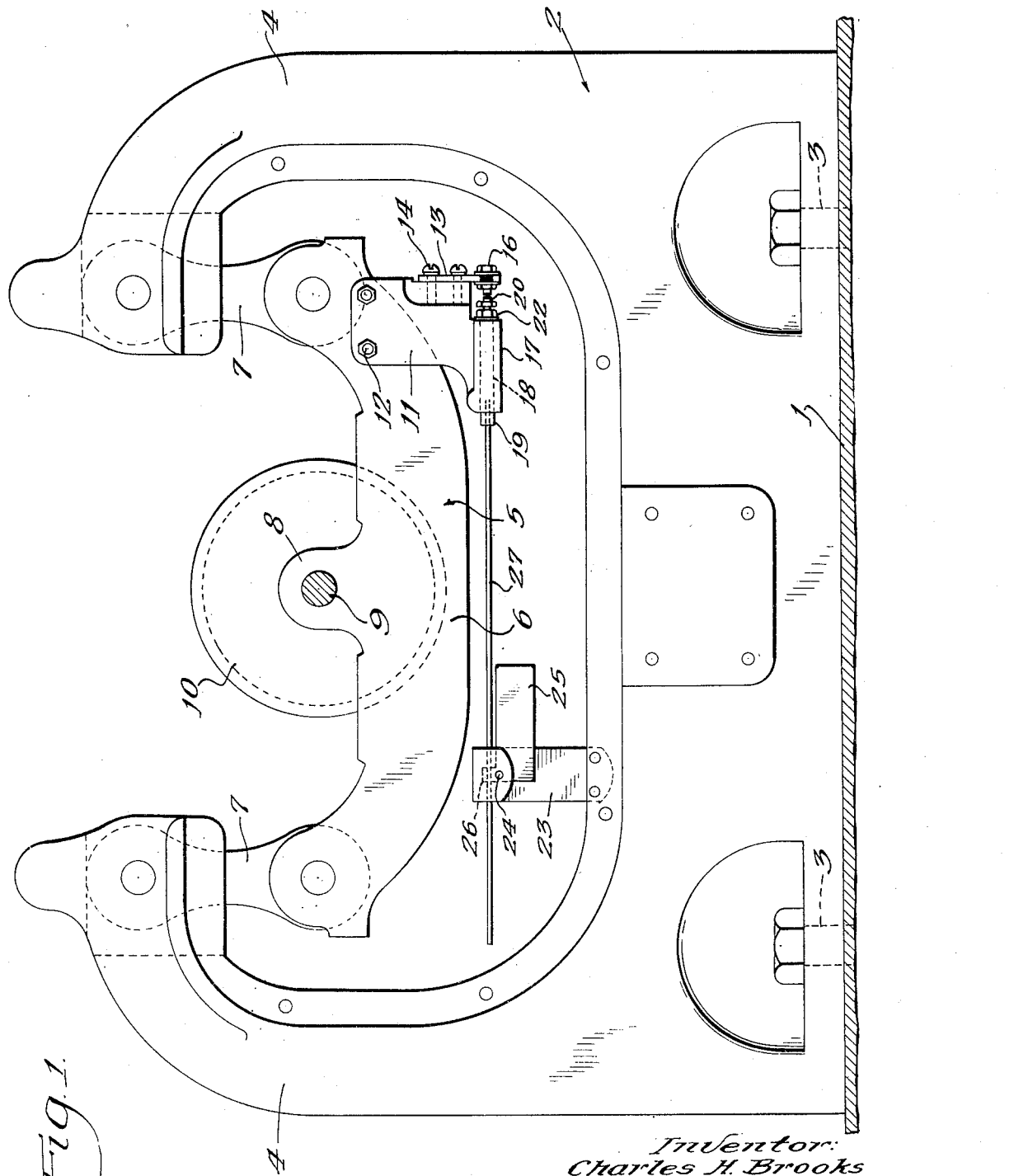
Fig. 1 is an elevational view of one cradle employed in a conventional balance testing machine.

The present invention is particularly adaptable for use with balance testing machines of the type comprising a frame, a pair of swingable cradles carried by the frame, the body to be tested being rotatably carried by a shaft journalled upon said cradles, said shaft being rotated by a motor or other suitable prime mover. Associated with each of the cradles is a make and break mechanism which is connected in the primary circuit of the usual spark coil whereby swingable movement of the cradles energizes the secondary circuit of the spark coil and gives an indication of the condition of unbalance of the rotating body. Such a balance testing machine is shown and described in the above identified Letters Patent Number 2,412,473.

Referring particularly to the drawings, 1 indicates the main frame of a balance testing machine, such as hereinbefore described. A pair of standards 2, one of which is illustrated, are mounted upon the frame 1 and secured thereto by means of bolts or the like 3. Each of the standards 2 has a pair of tower members 4, the upper ends of which extend inwardly toward each other.

A cradle 5 is supported by the tower members 4, said cradle comprising a transverse support 6 pivotally secured at its opposite ends to links 7. Each of the links 7 is pivotally carried by the upper inturned ends of the towers 4. A bearing 8 is carried by each of the supports 6 of cradles 5, being adapted to carry shaft 9 upon which body 10, the body whose balance is to be tested is mounted.

Thus far described the machine is conventional and comprises, per se, no part of the present invention. In the operation of this device, the shaft 9 is rotated at a speed, depending upon the body being tested, which may range from about 400 revolutions per minute to as high as 2500 revolutions per minute. If the body is in a state of unbalance the unbalance will cause supports 6 to oscillate horizontally, as viewed in Fig. 1, the extent of the maximum swing being substantially proportional to the degree of unbalance of the body.

The present invention contemplates a set of make and break contacts and associated mechanism which will now be described.

A plate 11 is secured by means of bolts 12 or the like, to the support 6 adjacent one end thereof. A plate 13 of insulating material such as Bakelite, fibre board or the like is carried by plate 11, being secured thereto by screws 14. The insulating plate 13 extends beneath plate 11 and carries a contact point 15 which is secured in place by nuts 16, the arrangement being such that a limited degree of adjustability is provided for point 15.

A sleeve 17 is formed integral with plate 11 and is provided with an elongated aperture 18 coaxial with point 15. A plunger 19 is slidably positioned in sleeve 17, said plunger, at its end adjacent point 15, carrying a contact point 20, the shank of which is threadedly engaged in the end of the plunger 19. Nut 21 is rigidly positioned upon the shank of the point 20 and affords means for screwing said shank into the plunger. Nut 22 is a stop which functions to limit movement of plunger 19 to the left, as viewed in Figs. 1 and 2.

An inverted J-shaped bracket 23 is rigidly mounted upon the standard 2, said bracket carrying a pin 24 upon which a weight 25 is pivoted. The weight 25 is provided with a sleeve portion 26, above the pivot pin 24, through which a rod 27 is slidably positioned. Rod 27 is rigidly secured to plunger 19 at its opposite end and is adapted to move therewith. It will be noted that the center of gravity of weight 25 is offset from the pivot pin 24 and, hence, said weight exerts a moment of force about said pivot pin tending to rotate said weight in a clockwise direction about the pin. This force is resisted by contact of the sleeve 26 upon rod 27 thereby establishing a frictional connection between rod 27 and weight 25.

In operation, body 10 is mounted upon shaft 9 and said shaft is rotated at a suitable speed. If the body 10 is unbalanced statically or dynamically the rotation thereof will cause the cradle 5 to swing. Contact point 15 is connected to one side of the primary circuit and point 20 is connected to the other side thereof, the latter being grounded upon the machine. The electrical connections are not shown inasmuch as they are well known in the art, with particular reference to Patent Number 2,412,473 hereinbefore mentioned.

It can readily be seen that as the cradle swings plate 11 moves therewith, and point 15 is rigidly carried by said plate. Point 20 also moves generally with the movement of plate 11, there being, however, a degree of limited movement of said point with respect to plate 11 and, hence, with respect to contact point 15. Referring particularly to Figs. 1 and 2, when cradle 5 swings to the left, contact point 15 makes contact with contact point 20 since the frictional connection between rod 27 and weight 25 frictionally resists relative motion between rod 27 and said weight. Hence, plunger 19 slides within sleeve 17 until points 15 and 20 make contact. Thereafter, motion to the left by cradle 5 moves both points 15 and 20 to the left. The primary circuit is thus completed. However, when cradle 5 reaches the end of its leftwise swing (depending in extent by the magnitude of unbalance of the body) and then reverses its motion, rod 27 and, hence, plunger 19 and contact point 20 remain stationary while contact point 15 moves away to the right from contact point 20. This retarding of movement of rod 27 is caused by its frictional connection with weight 25. Thus, the primary circuit is broken at the instant of reversal of movement of the cradle and high tension current is set up in the secondary circuit (not shown) and an indication is given, the indication showing that the point of unbalance of the body 10 has just passed the left horizontal. In this manner the point of greatest unbalance of the body is ascertained.

As the cradle 5 continues its swing to the right, nut 22 eventually contacts the end of sleeve 17 and rod 27, plunger 19 and contact point 20 are carried to the right, the latter being carried in spaced relationship, however, with respect to contact point 15. At the limit of the swing of the cradle 5 to the right and at the commencement of its swing to the left, contact point 20 again remains stationary until contact point 15 has again moved into contact therewith and the cycle is thus completed.

It can readily be seen that the arrangement hereinbefore described comprises an automatic means for selecting the substantially exact point of greatest unbalance of the body at a predetermined phase of its rotation at which to break the primary circuit and produce an indicating signal in the secondary circuit. It can also be seen that this automatic means of selection is substantially independent of the magnitude of unbalance of the body except for extremely small degrees of unbalance, that is, when the body 10 is substantially in balance. Hence, the testing of unbalance of a body can be made quickly without the necessity of manually adjusting the position of one of the contact points which is a relatively slow process.

In addition, in ascertaining the position of unbalance of a body by manually adjusting one of the contact points implies that the make and break of the circuit occurs almost instantaneously. At high speeds of rotation the period of "make" may not be sufficient to satisfy the time constant of the primary circuit and, hence, a weak or faulty secondary discharge may result. In the present invention, however, the period of "make" comprises substantially one-half cycle of rotation of the body and at all practical operating speeds a strong secondary discharge will result.

For simplicity and clarity of explanation, only one cradle is illustrated and described. It is to be understood, however, that two cradles are contemplated in the complete machine and a make and break mechanism such as herein described is mounted upon each, both being identical and separately operated, as contemplated in the mentioned Patent Number 2,412,473.

I claim as my invention:

1. A device for making and breaking an electric circuit in response to the swinging movement of a body which comprises, a frame, a cradle swingably mounted upon said frame, an electrical contact point rigidly carried by said cradle, a rod yieldably secured by friction to said frame, a lost motion connection between said rod and said cradle, and an electrical contact point carried by said rod in proximity to said first mentioned contact point whereby reversal of motion of said cradle makes and breaks the contact of said contact points.

2. A device for making and breaking an electric circuit in response to the swinging movement of a body which comprises, a frame, a cradle swingably mounted upon said frame, an electrical contact point rigidly carried by said cradle, a rod yieldably secured by friction to said frame, a sleeve carried by said cradle, a plunger positioned in said sleeve and having limited slidable movement therein, said plunger being connected at one end to said rod, a contact point carried at the opposite end of said plunger in proximity to said first mentioned contact point whereby reversal of motion of said cradle causes motion of said plunger in said sleeve to make and break contact of said contact points.

3. A device for making and breaking an electric circuit in response to the swinging movement of a body which comprises, a frame, a cradle swingably mounted upon said frame, an electrical contact point rigidly carried by said cradle, an eccentrically mounted weight pivotally secured to said frame, a sleeve carried by said weight, a rod slidably positioned in said sleeve to hold the center of gravity of said weight offset with respect to the pivot point of said weight whereby to yieldably secure said rod by friction to said frame, a lost motion connection between said rod and said cradle, and an electrical contact point carried by said rod in proximity to said first mentioned contact point whereby reversal of motion of said cradle makes and breaks the contact of said contact points.

4. A device for making and breaking an electric circuit in response to the swinging movement of a body which comprises, a frame, a cradle swingably mounted upon said frame, an electrical contact point rigidly carried by said cradle, an eccentrically mounted weight pivotally secured to said frame, a sleeve carried by said weight, a rod slidably positioned in said sleeve to hold the center of gravity of said weight offset with respect to the pivot point of said weight whereby to yieldably secure said rod by friction to said frame, a sleeve carried by said cradle, a plunger positioned in said sleeve and having limited slidable movement therein, said plunger being connected at one end to said rod, a contact point carried at the opposite end of said plunger in proximity to said first mentioned contact point whereby reversal of motion of said cradle causes motion of said plunger in said sleeve to make and break contact of said contact points.

CHARLES H. BROOKS.

REFERENCES CITED

The following references are of record in the file of this patent:

UNITED STATES PATENTS

| Number | Name | Date |
|---|---|---|
| 836,303 | Christensen | Nov. 20, 1906 |
| 1,401,991 | Lehr | Jan. 3, 1922 |
| 2,005,122 | Young et al. | June 18, 1935 |
| 2,170,900 | Jandus et al. | Aug. 29, 1939 |
| 2,349,530 | Weaver et al. | May 23, 1944 |
| 2,392,477 | Holm | Jan. 8, 1946 |